United States Patent [19]

Shannon et al.

[11] Patent Number: 6,013,126

[45] Date of Patent: Jan. 11, 2000

[54] PROCESS FOR CONDITIONING ORGANIC PIGMENTS

[75] Inventors: Charles E. Shannon, Summerville; Abdul Sattar, Mt. Pleasant; Robert C. Mott; Thomas R. Flatt, both of Summerville, all of S.C.

[73] Assignee: Bayer Corporation, Pittsburgh, Pa.

[21] Appl. No.: 09/200,272

[22] Filed: Nov. 25, 1998

[51] Int. Cl.[7] .......................... C09B 67/00; C09B 67/04; C09B 67/14

[52] U.S. Cl. .......................... 106/493; 106/494; 106/495; 106/496; 106/497; 106/498; 106/499; 106/505

[58] Field of Search .................................... 106/493, 494, 106/495, 496, 497, 498, 499, 505

[56] References Cited

U.S. PATENT DOCUMENTS

| | | | |
|---|---|---|---|
| 2,905,685 | 9/1959 | Eckert et al. | 200/281 |
| 3,264,300 | 8/1966 | Kelly et al. | 546/56 |
| 3,342,823 | 9/1967 | Dien | 260/279 |
| 3,936,315 | 2/1976 | Ferrill, Jr. et al. | 106/412 |
| 4,077,972 | 3/1978 | Baurecht et al. | 540/136 |
| 4,287,000 | 9/1981 | Buckwalter | 106/412 |
| 4,298,399 | 11/1981 | Formica et al. | 106/413 |
| 4,404,036 | 9/1983 | Donegan | 106/412 |
| 4,493,734 | 1/1985 | Flatt | 106/413 |
| 4,970,248 | 11/1990 | Tanner | 524/94 |
| 5,776,238 | 7/1998 | Kerwin et al. | 106/412 |

OTHER PUBLICATIONS

W. Carr, Improving the Physical Properties of Pigments in Pigment Handbook, vol. III (New York: John Wiley & Sons, 1973) month unavailable, pp. 29–31.

*Primary Examiner*—Anthony Green
*Attorney, Agent, or Firm*—Joseph C. Gil; Richard E.L. Henderson

[57] ABSTRACT

This invention relates to a process for conditioning organic pigments by (a) grinding a crude organic pigment at a temperature of about 0° C. to about 100° C. in the presence of (i) about 1 to about 10 parts by weight, relative to the organic pigment, of an inorganic salt and (ii) about 1 to about 5 parts by weight, relative to the organic pigment, of a liquid in which the organic pigment and salt are substantially insoluble, to form a pigment paste;

(b) grinding the pigment paste at a temperature of about 0° C. to about 100° C. in the presence of about 0.05 to about 1 parts by weight, relative to the organic pigment, of a $C_8$–$C_{10}$ alkanoic acid to form a treated pigment paste;

(c) stirring the treated pigment paste with water or water containing an acid and/or an organic liquid to complete the conditioning of the organic pigment; and (d) isolating the conditioned organic pigment.

16 Claims, No Drawings

PROCESS FOR CONDITIONING ORGANIC PIGMENTS

BACKGROUND OF THE INVENTION

This invention relates to a process for preparing organic pigments having excellent pigmentary properties and dispersibilities, especially when used to color polymeric materials.

Crude organic pigments are generally unsuitable for use as initially isolated and must be subjected to one or more additional finishing steps that modify particle size, particle shape, and/or crystal structure in such a way that provides good pigmentary quality. See, for example, K. Merkle and H. Schäfer, "Surface Treatment of Organic Pigments" in *Pigment Handbook*, Vol. III (New York: John Wiley & Sons, Inc., 1973), page 157; R. B. McKay, "The Development of Organic Pigments with Particular Reference to Physical Form and Consequent Behavior in Use" in *Rev. Prog. Coloration*, 10, 25–32 (1979); and R. B. McKay, "Control of the application performance of classical organic pigments" in *JOCCA*, 89–93 (1989).

The most commonly used conditioning methods involve dissolving or suspending the crude pigment in suitable liquids, especially strong mineral acids, and/or milling. E.g., W. Carr, "Improving the Physical Properties of Pigments" in *Pigment Handbook*, Vol. III (New York: John Wiley & Sons, 1973), pages 29–31; see also U.S. Pat. Nos. 4,493,734, 4,404,036, 4,298,399, 4,287,000, 4,077,972, 3,936,315, and 3,264,300, European Patent Applications 638,615 and 69,895, and British Patent 1,438,921. Conditioning with a strong acid involves treating the crude pigment with aqueous mineral acid (preferably sulfuric acid) in a process known as "acid pasting" (in which an acidic solution containing protonated pigment is formed) or "acid swelling" (in which a suspension of protonated pigment is formed). It is also possible to condition the crude pigment using a liquid other than a strong acid, such as organic acids, alcohols (including glycols), ethers, ketones, aromatics, esters, and amides. Milling can be carried out using dry-milling methods and wet-milling methods in the presence of water and/or various organic liquids, with or without additives. Crude organic pigments can also be premilled and then treated with an organic liquid. In salt grinding, a crude organic pigment is ground in the presence of an inorganic salt that is subsequently removed by washing. Each of these methods, however, is attended by practical difficulties and does not always produce pigments having desirable combinations of color properties and dispersibility.

U.S. Pat. No. 4,970,248 discloses a process for converting the alpha form of a particular isoindolineazine pigment into the gamma form by salt grinding or kneading the pigment in the presence of solvents and/or surfactants and optional texture improving agents. The optional texture improving agents are described as being fatty acids or derivatives having at least twelve carbon atoms, quaternary ammonium salts, plasticizers, waxes, resin acids, or $C_{12}$–$C_{18}$ paraffin disulfonic acids, alkylphenols, or alcohols that can be added before, during, or after salt kneading or grinding. Lower carboxylic acids are not disclosed. In addition, the patent is directed only to a method for changing one crystal form to another crystal form.

U.S. Pat. No. 5,776,238 discloses a process for converting a crude pigment into a pigmentary form by kneading the crude pigment in the presence of a liquid carboxylic acid and an optional salt. The liquid carboxylic acid is used instead of other types of organic solvent.

It has now been found that conditioning an organic pigment in a stepwise salt grinding process using a non-solvent liquid followed by a $C_8$–$C_{10}$ alkanoic acid produces excellent dispersibility without further conditioning steps.

SUMMARY OF THE INVENTION

This invention relates to a process for conditioning an organic pigment comprising (a) grinding a crude organic pigment at a temperature of about 0° C. to about 100° C. (preferably 30° C. to 60° C.) in the presence of (i) about 1 to about 10 parts by weight (preferably 4 to 6 parts by weight), relative to the organic pigment, of an inorganic salt (preferably sodium chloride) and (ii) about 1 to about 5 parts by weight (preferably 1 to 2 parts by weight), relative to the organic pigment, of a liquid in which the organic pigment and salt are substantially insoluble (preferably an aliphatic glycol), to form a pigment paste;

(b) grinding the pigment paste at a temperature of about 0° C. to about 100° C. (preferably 30° C. to 60° C.) in the presence of about 0.05 to about 1 parts by weight (preferably about 0.1 to about 0.25 parts by weight), relative to the organic pigment, of a $C_8$–$C_{10}$ alkanoic acid (preferably neodecanoic acid) to form a treated pigment paste;

(c) stirring the treated pigment paste with water or water containing an acid and/or an organic liquid (preferably at a temperature of about 90° C. to about 95° C.) to complete the conditioning of the organic pigment; and (d) isolating the conditioned organic pigment.

DETAILED DESCRIPTION OF THE INVENTION

Organic pigments that can be treated by the process of the present invention include perylene, dioxazine, quinacridone, phthalocyanine, and indanthrone pigments, as well as other known organic pigments. Mixtures, including solid solutions, of such pigments are also suitable.

Perylenes, especially the diimides and dianhydrides of perylene-3,4,9,10-tetracarboxylic acid, are particularly suitable organic pigments. Suitable perylene pigments can be unsubstituted or substituted (for example, with one or more alkyl, alkoxy, halogens such as chlorine, or other substituents typical of perylene pigments), including perylenes substituted at imide nitrogen atoms with chemically reasonable groups such as alkyl. Crude perylenes can be prepared by methods known in the art. For example, W. Herbst and K. Hunger, *Industrial Organic Pigments*, 2nd ed. (New York: VCH Publishers, Inc., 1997), pages 9 and 476–479; H. Zollinger, *Color Chemistry* (VCH Verlagsgessellschaft, 1991), pages 227–228 and 297–298; M. A. Perkins, "Pyridines and Pyridones" in *The Chemistry of Synthetic Dyes and Pigments*, ed. H. A. Lubs (Malabar, Fla.: Robert E. Krieger Publishing Company, 1955), pages 481–482; and U.S. Pat. No. 2,905,685.

Other particularly suitable pigments include dioxazine pigments (that is, triphenedioxazines) prepared by methods known in the art. E.g., W. Herbst and K. Hunger, *Industrial Organic Pigments* (New York: VCH Publishers, Inc., 1993), pages 534–537. Carbazole Violet 23 is a particularly preferred dioxazine pigment.

Quinacridone pigments are also suitable organic pigments. Quinacridones (which include unsubstituted quinacridone, quinacridone derivatives, and solid solutions thereof) can be prepared by any of several methods known in the art but are preferably prepared by thermally ring-closing various 2,5-dianilinoterephthalic acid precursors in the presence of polyphosphoric acid. E.g., W. Herbst and K. Hunger, *Industrial Organic Pigments,* 2nd ed. (New York: VCH Publishers, Inc., 1997), pages 454–461; S. S. Labana and L. L. Labana, "Quinacridones" in *Chemical Review,* 67, 1–18 (1967); and U.S. Pat. Nos. 3,157,659, 3,256,285, 3,257,405, 3,317,539, and 3,342,823. Suitable quinacridone pigments can be unsubstituted or substituted (for example, with one or more alkyl, alkoxy, halogens such as chlorine, or other substituents typical of quinacridone pigments).

Metal phthalocyanine pigments are also suitable organic pigments. Although copper phthalocyanines are preferred, other metal-containing phthalocyanine pigments, such as those based on zinc, cobalt, iron, nickel, and other such metals, may also be used. Suitable phthalocyanine pigments can be unsubstituted or partially substituted (for example, with one or more alkyl, alkoxy, halogens such as chlorine, or other substituents typical of phthalocyanine pigments). Crude phthalocyanines can be prepared by any of several methods known in the art but are preferably prepared by a reaction of phthalic anhydride, phthalonitrile or derivatives thereof with a metal donor, a nitrogen donor (such as urea or the phthalonitrile itself), and an optional catalyst, preferably in an organic solvent. E.g., W. Herbst and K. Hunger, *Industrial Organic Pigments,* 2nd ed. (New York: VCH Publishers, Inc., 1997), pages 424–433; H. Zollinger, *Color Chemistry* (VCH Verlagsgessellschaft, 1991), pages 101–104; and N. M. Bigelow and M. A. Perkins, "Phthalocyanine Pigments" in *The Chemistry of Synthetic Dyes and Pigments,* ed. H. A. Lubs (Malabar, Fla.: Robert E. Krieger Publishing Company, 1955), pages 584–587; see also U.S. Pat. Nos. 4,158,572, 4,257,951, and 5,175,282 and British Patent 1,502,884.

Suitable pigments also include indanthrone pigments prepared by methods known in the art. E.g., W. Herbst and K. Hunger, *Industrial Organic Pigments* (New York: VCH Publishers, Inc., 1993), pages 498–500; H. Zollinger, *Color Chemistry* (VCH Verlagsgessellschaft, 1991), pages 219–220 (see also page 237); and M. S. Whelen, "Anthraquinoneazines" in *The Chemistry of Synthetic Dyes and Pigments,* ed. H. A. Lubs (Malabar, Fla.: Robert E. Krieger Publishing Company, 1955), pages 512–522. Indanthrone pigments can be unsubstituted or partially substituted, for example, with one or more alkyl, alkoxy, halogens such as chlorine, or other substituents typical of indanthrone pigments. Underivatized indanthrone (Pigment Blue 60 or, alternatively, Vat Blue 4) is particularly preferred.

Other suitable organic pigments include 1,4-diketopyrrolopyrroles, anthrapyrimidines, anthanthrones, flavanthrones, isoindolines, isoindolinones, perinones, pyranthrones, thioindigos, 4,4'-diamino-1,1'-dianthraquinonyl, and azo compounds, as well as substituted derivatives.

Crude organic pigments can be ground in step (a) using any of various known salt grinding methods (also referred to as "salt kneading"). In general, a crude organic pigment is ground within a suitable high-shear mixer containing about 1 to about 10 parts by weight (preferably 4 to 6 parts by weight) of an inorganic salt per part of organic pigment and about 1 to about 5 parts by weight (preferably 1 to 2 parts by weight) of a liquid in which the organic pigment and salt are substantially insoluble.

Suitable salts for salt grinding include sodium chloride, potassium chloride, calcium chloride, zinc chloride, aluminum chloride, sodium sulfate, aluminum sulfate, calcium carbonate, sodium acetate, calcium acetate, sodium citrate, potassium sodium tartrate. Sodium chloride is particularly convenient and preferred.

Suitable liquids for use in salt grinding are liquids (preferably organic liquids or low-melting solids that liquefy during grinding) in which the organic pigment and salt are substantially insoluble but which enable the physical transformation of crude pigment to conditioned pigment to take place when carrying out the process of the present invention. Examples of suitable organic liquids are alcohols, such as methanol, ethanol, ethylene glycol, propylene glycol, or glycerin; lower organic acids, such as formic or acetic acid; ethers such as dioxane, tetrahydrofuran, ethylene glycol monoethyl or diethyl ether, or oligo- and polyglycol ethers; ketones, such as acetone or methyl ethyl ketone; aromatics, such as toluene, xylene, chlorobenzene, nitrobenzene, or chloronaphthalene; esters, such as methyl benzoate, dimethyl phthalate, or methyl salicylate; and amides, such as formamide, dimethylformamide, or N-methyl-pyrrolidone. Preferred organic liquids are glycols, particularly ethylene glycol and propylene glycol. It is possible, but generally less preferred, to include small amounts of water that should not exceed 50% of the total amount of liquid, including the amount of water that may be present in the crude pigment. Although virtually any high-shear mixer can be used, continuous sigma blade high-shear mixers are preferred.

The initial grinding step (a) is carried out at a temperature of about 0° C. to about 100° C. (preferably 30° C. to 60° C.) for a period sufficient to produce a uniform paste. Although it is possible to use a relatively large amount of the liquid, which will generally produce a thin pigment mass, it is generally necessary to use only an amount of liquid that will produce a relatively thick pigment mass. If, on the other hand, the pigment mass becomes too thick during the grinding step, either because some of the liquid evaporates or because the pigment particles become finer, it may be desirable to add small amounts of the liquid to maintain effective and efficient grinding.

A critical feature of the invention is the addition of a $C_8$–$C_{10}$ alkanoic acid after the initial grinding step has produced a uniform pigment mass. Suitable alkanoic acids are straight or branched alkane carboxylic acids having a total of 8 to 10 carbon atoms, including octanoic acid, nonanoic acid, decanoic acid, and isomeric forms thereof. Branched chain $C_8$–$C_{10}$ alkanoic acids are generally preferred. Neodecanoic acid (i.e., 7,7-di-methyloctanoic acid) is particularly preferred.

Although the quantity of $C_8$–$C_{10}$ alkanoic acid can range from about 5% by weight of the amount of organic pigment up to about an equal quantity, it is generally preferred to use about 10% to about 25% by weight of the $C_8$–$C_{10}$ alkanoic acid relative to the organic pigment.

The initially formed paste is ground in step (b) at a temperature of about 0° C. to about 100° C. (preferably 30° C. to 60° C.) for a period of at least three hours (preferably three to twelve hours). Although it is possible to use a different mixer that that used in step (a), step (b) is preferably carried out in situ in the same mixer.

In step (c), the pigment paste from step (b) is poured into water, which may optionally contain or be treated with an acid and/or various organic liquids (preferably water-miscible organic liquids).

Acids that are capable of forming soluble metal salts can be added during step (c) to help remove metal or metal oxide contaminants from the pigment mass. Suitable acids include mineral acids such as hydrochloric acid and sulfuric acid and at least moderately acidic organic acids such as acetic acid, trifluoroacetic acid, and citric acid.

Although it is generally preferable to use only water in step (c), it also possible to include certain organic liquids. Suitable organic liquids for use in step (c) include lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally much less preferred. If a low volatility water-immiscible organic liquid is used at any step in the process of the invention, it may be necessary to wash the pigment in two steps using water to remove salts and other water-soluble materials and using a more volatile organic solvent to remove the remaining materials.

Step (c) is carried out by stirring the mixture at essentially any temperature at which the mixture does not freeze or boil, which corresponds to a range of about 0° C. to about 100° C. for aqueous mixtures. However, temperatures near the boiling point of the mixture (typically about 90° C. to about 95° C.) are generally preferred.

The conditioned pigment thus obtained is collected in step (d) by methods known in the art, preferably filtration followed by washing to remove residual acid. Other collection methods known in the art, such as membrane filtration, centrifugation, or even simple decantation, are suitable but generally less preferred. The pigment is then dried for use or for further conditioning, for example, by milling.

Although the conditioned organic pigments already exhibit excellent color properties and dispersibilities, the isolated pigments can be blended (preferably by dry blending) with one or more pigment derivatives known in the art, particularly phthalimidomethyl, sulfonic acid, and sulfonamide derivatives.

Pigments prepared according to the present invention are particularly suitable for use with macromolecular materials, especially synthetically produced macromolecular substances. Examples of synthetic macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. The materials pigmented with the pigments of the invention can have any desired shape or form, including molded articles, films, and fibers.

Pigments prepared according to the present invention are also suitable for pigmented mixtures with other materials, pigment formulations, coating compositions and paints, printing ink, and colored paper. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of coating compositions and paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Pigment dispersibilities in polyvinyl chloride ("PVC") were evaluated by comparing hot-milled and cold-milled color development according to the following procedure. For each sample tested, a mixture of 48.95 g of flexible PVC and 1.0 g of a 50% titanium dioxide paste was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness of 21 mils (ca. 0.5 mm), then folded and passed through the mill seven times. The cold-rolled sheet was again fluxed in the hot mill until smooth. A sample cut from the resultant sheet was used as the "cold-milled" sample for evaluation. The reflectances of corresponding hot-milled and cold-milled samples were determined using a Datacolor CS-5 spectrophotometer and converted to K/S values according to the Kubelka-Munk equation. Dispersibilities were calculated by comparing the K/S value of each hot-milled sample with the K/S value of the corresponding cold-milled samples (which are assumed to have reached 100% dispersion and maximum K/S values).

Example 1–8

Examples 1–8 illustrate the effect on various pigments of using 10% by weight, relative to each pigment, of neodecanoic acid according to the invention.

Example 1

Pigment Red 149

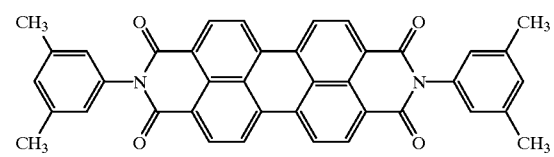

To a Baker-Perkins sigma blade mixer having a one-liter capacity was added 160 g of micronized salt and 32 g of crude Pigment Red 149 (N,N'-bis(3,5-dimethylphenyl) perylenetetracarboxylic diimide prepared by the method of U.S. Pat. No. 2,905,685). The blend of pigment and salt was mixed for ten minutes, after which 30 g of propylene glycol was added. The resultant blend was mixed for fifteen minutes, after which an additional 13.5 g of propylene glycol was added. The resultant uniform stiff paste was mixed for three hours at a temperature of 50–55° C. Propylene glycol was added as needed to maintain uniformity of the paste. After adding 3.2 g of neodecanoic acid, the paste was mixed for an additional 30 minutes at 50–55° C. The pigment mass was discharged into 600 ml of water and acidified with dilute hydrochloric acid. The resultant slurry was stirred for one hour at 90° C. The solid component was collected by filtration, washed with water, dried, and pulverized to yield pigmentary Pigment Red 149 as a powder having excellent dispersibility in PVC. Test results are shown in Table 1.

Example 2

Pigment Red 149 (comparison)

Crude Pigment Red 149 was processed by the method of Example 1 except for omitting the neodecanoic acid. The resultant pigment exhibited dramatically inferior dispersibility when compared to the perylene pigment prepared in Example 1 according to the invention. Test results are shown in Table 1.

Example 3

Carbazole Violet 23

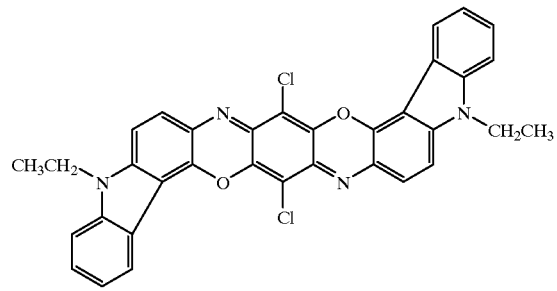

Crude Carbazole Violet 23 (a dioxazine pigment available as Sumitomo Fast Violet RL Base from Sumitomo) was processed by the method of Example 1 except for using crude Carbazole Violet 23 instead of Pigment Red 149. Pigmentary Carbazole Violet 23 was obtained as a powder having excellent dispersibility in PVC. Test results are shown in Table 1.

Example 4

Carbazole Violet 23 (comparison)

Crude Carbazole Violet 23 was processed by the method of Example 3 except for omitting the neodecanoic acid. The resultant pigment exhibited noticeably inferior dispersibility when compared to the pigment prepared in Example 3 according to the invention. Test results are shown in Table 1.

Example 5

Pigment Red 202

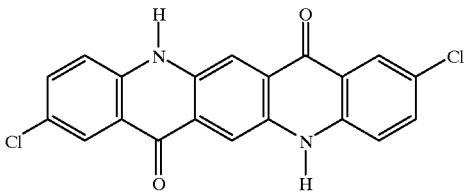

Crude Pigment Red 202 (2,9-dichloroquinacridone prepared by the method of U.S. Pat. No. 3,342,823) was processed by the method of Example 1 except for using crude Pigment Red 202 instead of Pigment Red 149. Pigmentary Pigment Red 202 was obtained as a powder. Test results are shown in Table 1.

Example 6

Pigment Red 202 (comparison)

Crude Pigment Red 202 was processed by the method of Example 5 except for omitting the neodecanoic acid. The resultant pigment exhibited noticeably inferior dispersibility when compared to the quinacridone pigment prepared in Example 5 according to the invention. Test results are shown in Table 1.

Example 7

Pigment Blue 60

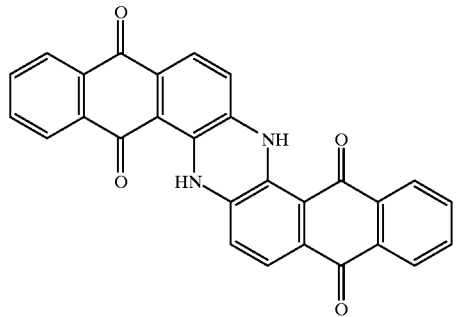

Crude Pigment Blue 60 (indanthrone available as Navinon Blue RSN from Indian Dyestuff Industries) was processed by the method of Example 1 except for using crude Pigment Blue 60 instead of Pigment Red 149. Pigmentary Pigment Blue 60 was obtained as a powder. Test results are shown in Table 1.

Example 8

Pigment Blue 60 (comparison)

Crude Pigment Blue 60 was processed by the method of Example 7 except for omitting the neodecanoic acid. The resultant pigment exhibited noticeably inferior dispersibility when compared to the indanthrone pigment prepared in Example 7 according to the invention. Test results are shown in Table 1.

TABLE 1

Test results for Examples 1–8

| Example | Pigment | Dispersibility in PVC (%) |
|---|---|---|
| 1 | Pigment Red 149 | 92.2% |
| 2 (comp) | Pigment Red 149 | 48.6% |
| 3 | Carbazole Violet 23 | 92.8% |
| 4 (comp) | Carbazole Violet 23 | 82.2% |
| 5 | Pigment Red 202 | 27.1% |
| 6 (comp) | Pigment Red 202 | 16.6% |
| 7 | Pigment Blue 60 | 29.4% |
| 8 (comp) | Pigment Blue 60 | 13.7% |

The data in Table 1 show that the inclusion of neodecanoic acid during conditioning improved the dispersibility of all of the pigments tested.

Example 9–15

Examples 9–15 illustrate the effect of using various amounts of neodecanoic acid and of using other $C_8$–$C_{10}$ alkanoic acids with Pigment Red 149 according to the invention.

Example 9 (comparison)

Crude Pigment Red 149 was processed by the method of Example 2 (i.e., only with propylene glycol) except that a different batch of crude Pigment Red 149 was used. The resultant pigment exhibited dramatically inferior dispersibility when compared to perylene pigments prepared according to the invention. Test results are shown in Table 2.

Example 10 (comparison)

Crude Pigment Red 149 was processed by the method of Example 9 except for using 43.5 g (i.e., 136% by weight) of neodecanoic acid instead of propylene glycol in a single grinding step. Despite the use of much larger relative amounts of neodecanoic acid, the resultant perylene pigment exhibited a dispersibility that was inferior to the perylene pigment of Example 12 of the invention (which used 10% by weight neodecanoic acid after initial propylene glycol treatment) and essentially the same as the perylene pigment of Example 11 of the invention (which used only 5% by weight neodecanoic acid after initial propylene glycol treatment). Test results are shown in Table 2.

Example 11

Crude Pigment Red 149 selected from the same batch as used in Example 9 was processed by the method of Example 1 except for using 1.6 g (i.e., 5% by weight) of neodecanoic acid. Pigmentary Pigment Red 149 was obtained as a powder having good dispersibility in PVC. Test results are shown in Table 2.

Example 12

Crude Pigment Red 149 selected from the same batch as used in Example 9 was processed by the method of Example 1 (i.e., using 10% by weight neodecanoic acid). Pigmentary Pigment Red 149 was obtained as a powder having excellent dispersibility in PVC. Test results are shown in Table 2.

Example 13

Crude Pigment Red 149 selected from the same batch as used in Example 9 was processed by the method of Example 1 except for using nonanoic acid. Pigmentary Pigment Red 149 was obtained as a powder having good dispersibility in PVC. Test results are shown in Table 2.

Example 14

Crude Pigment Red 149 selected from the same batch as used in Example 9 was processed by the method of Example 1 except for using 2-ethylhexanoic acid. Pigmentary Pigment Red 149 was obtained as a powder having good dispersibility in PVC. Test results are shown in Table 2.

Example 15 (comparison)

Crude Pigment Red 149 selected from the same batch as used in Example 9 was processed by the method of Example 1 except for using hexanoic acid (a six-carbon alkanoic acid). Pigmentary Pigment Red 149 was obtained as a powder having poor dispersibility in PVC. Test results are shown in Table 2.

Example 16 (comparison)

Crude Pigment Red 149 selected from the same batch as used in Example 9 was processed by the method of Example 1 except for using lauric acid (a twelve-carbon alkanoic acid; compare U.S. Pat. No. 4,970,248). Pigmentary Pigment Red 149 was obtained as a powder having excellent dispersibility in PVC. Test results are shown in Table 2.

Example 17 (comparison)

Crude Pigment Red 149 selected from the same batch as used in Example 9 was processed by the method of Example 1 except for using stearic acid (an eighteen-carbon alkanoic acid; see U.S. Pat. No. 4,970,248). Pigmentary Pigment Red 149 was obtained as a powder having excellent dispersibility in PVC. Test results are shown in Table 2.

TABLE 2

Test results for Examples 9–15

| Example | Alkanoic acid | Dispersibility in PVC (%) |
|---|---|---|
| 9 (comp) | No alkanoic acid (only propylene glycol) | 58.6% |
| 10 (comp) | Neodecanoic acid (136%) (no propylene glycol) | 71.8% |
| 11 | Neodecanoic acid (5%) | 71.1% |
| 12 | Neodecanoic acid (10%) | 91.5% |
| 13 | Nonanoic acid (10%) | 76.7% |
| 14 | 2-Ethylhexanoic acid (10%) | 73.9% |
| 15 (comp) | Hexanoic acid (10%) | 61.6% |
| 16 (comp) | Lauric acid (10%) | 94.7% |
| 17 (comp) | Stearic acid (10%) | 86.2% |

The data in Table 2 show that stepwise salt grinding of Pigment Red 149 in the presence of propylene glycol followed by an $C_8$–$C_{10}$ alkanoic acid according to the invention produced pigments having improved PVC dispersibilities despite using carboxylic acids containing fewer than twelve carbon atoms.

What is claimed is:

1. A process for conditioning an organic pigment comprising (a) grinding a crude organic pigment at a temperature of about 0° C. to about 100° C. in the presence of (i) about 1 to about 10 parts by weight, relative to the organic pigment, of an inorganic salt and (ii) about 1 to about 5 parts by weight, relative to the organic pigment, of a liquid in which the organic pigment and salt are substantially insoluble, to form a pigment paste;

(b) grinding the pigment paste at a temperature of about 0° C. to about 100° C. in the presence of about 0.05 to about 1 parts by weight, relative to the organic pigment, of a $C_8$–$C_{10}$ alkanoic acid to form a treated pigment paste;

(c) stirring the treated pigment paste with water or water containing an acid capable of forming soluble metal salts and/or an organic liquid to complete the conditioning of the organic pigment; and (d) isolating the conditioned organic pigment.

2. A process according to claim 1 wherein the organic pigment is a perylene, dioxazine, quinacridone, phthalocyanine, or indanthrone pigment.

3. A process according to claim 1 wherein the inorganic salt used in step (a) is sodium chloride.

4. A process according to claim 1 wherein the liquid used in step (a) is an aliphatic glycol.

5. A process according to claim 1 wherein the liquid used in step (a) is propylene glycol.

6. A process according to claim 1 wherein step (a) is carried out at a temperature of 30° C. to 60° C.

7. A process according to claim 1 wherein the $C_8$–$C_{10}$ alkanoic acid used in step (b) is a branched chain $C_8$–$C_{10}$ alkanoic acid.

8. A process according to claim 1 wherein the $C_8$–$C_{10}$ alkanoic acid used in step (b) is neodecanoic acid.

9. A process according to claim 1 wherein step (b) is carried out at a temperature of 30° C. to 60° C.

10. A process according to claim 1 wherein about 0.1 to about 0.25 parts by weight of the $C_8$–$C_{10}$ alkanoic acid, relative to the organic pigment, are used in step (b).

11. A process according to claim 1 wherein in step (c) the pigment paste from step (b) is stirred with water.

12. A process according to claim 1 wherein in step (c) the pigment paste from step (b) is stirred with water containing an acid.

13. A process according to claim 10 wherein the acid capable of forming soluble metal salts is a mineral acid or an organic acid.

14. A process according to claim 1 wherein step (c) is carried out at a temperature of about 90° C. to about 95° C.

15. An organic pigment conditioned by the process of claim 1.

16. A pigmented macromolecular material containing as pigment an organic pigment conditioned by the process of claim 1.

* * * * *